Nov. 3, 1970   J. A. HENRICKSON ET AL   3,537,828
COMPOSITE STAINLESS STEEL ARTICLE
Filed Feb. 13, 1967                    2 Sheets-Sheet 1
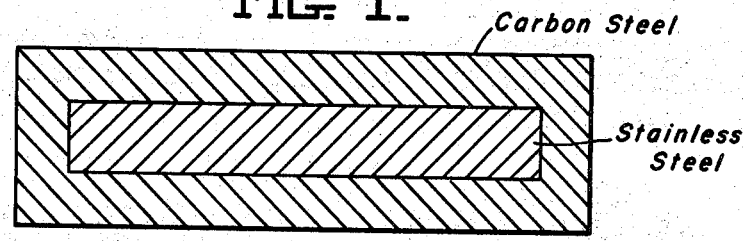
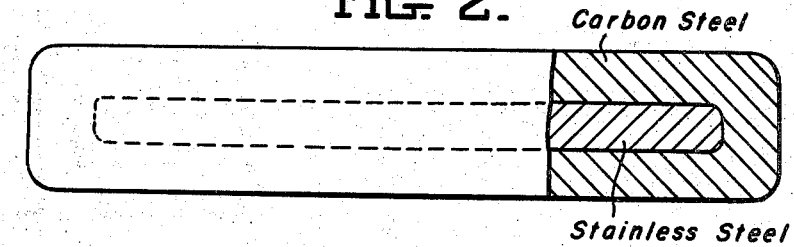
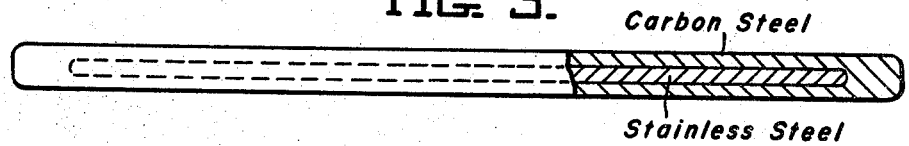
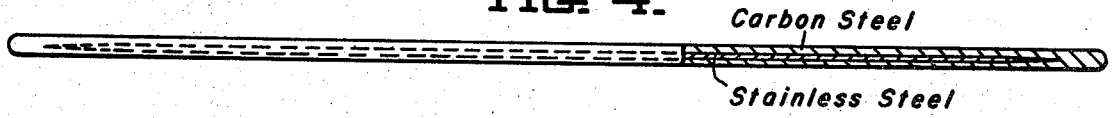
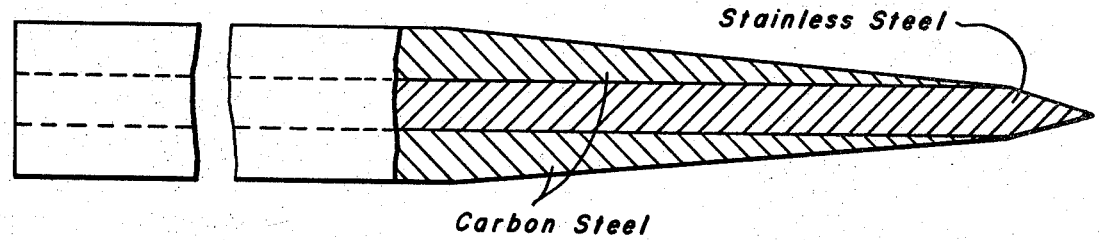
INVENTORS.
JOHN A. HENRICKSON and
NICHOLAS MAKRIDES
By Donald G. Dalton
Attorney INVENTORS.
JOHN A. HENRICKSON and
NICHOLAS MAKRIDES
By Donald G. Dalton
Attorney

United States Patent Office 3,537,828
Patented Nov. 3, 1970

3,537,828
COMPOSITE STAINLESS STEEL ARTICLE
John A. Henrickson, Bedford, and Nicholas Makrides,
Cleveland Heights, Ohio, assignors to United States
Steel Corporation, a corporation of Delaware
Filed Feb. 13, 1967, Ser. No. 615,745
Int. Cl. B32b 15/18
U.S. Cl. 29—196.1                              1 Claim

ABSTRACT OF THE DISCLOSURE

A composite article containing a non-austenitic stainless steel core and a carbon steel cladding suitable for cutlery manufacture and a method of making the article. The method involves assembling a sandwich of the carbon steel cladding and stainless steel core, metallurgically bonding the cladding and core, working the assembly to gauge and grinding the edge to expose the stainless steel core.

---

The present invention relates to a novel composite article containing a stainless steel core which is particularly suitable for use in manufacture of cutlery and razor blades and to a method of making same. The term "cutlery" as used herein refers generically to all forms of cutting implements including razor blades.

Stainless steels have been used for the production of a growing portion of blades for cutlery and razors. The most commonly used stainless steel contains about 0.95% carbon, 0.90% manganese, 0.020% phosphorus, 0.020% sulfur, 0.25% silicon and 13.5% chromium. Such a steel is known at Type 420 and is used in manufacture of razor blades which have a useful life greater than the formerly used high-carbon, low-alloy steels.

Stainless steel blades are, however, more expensive than the carbon steel products formerly used, although their increased effectiveness and usefulness compensate to a large extent for the higher costs. It is an object of the present invention to reduce the cost of stainless steel cutlery by minimizing the amount of stainless steel in the final product. There is provided in accordance with the invention a carbon steel-clad stainless steel product which possesses all the cutting advantages of stainless steel for cutlery and utilizes carbon steel to replace a portion of the more expensive stainless steel.

The present invention avoids the aforementioned difficulties. The carbon steel-clad stainless composite can be processed at lower production cost, because carbon-steel strip practices can be used rather than the more costly stainless-steel practices. Greater total reductions can be taken thus requiring fewer process annealings to produce a thin gauge razor-blade material; it will not be as notch sensitive thus resulting in less strip breakage; it will be less prone to edge cracking resulting in less slitting scrap; and can be batch annealed without the formation of abrasive chrome-oxides on the surface, which is normally encountered on the 100% stainless material in batch annealing.

The carbon clad portion of the composite is anodic to the stainless core. Therefore, in the presence of water and salts from the skin in shaving, any galvanic cell developed would result in protection of the stainless cutting edge.

There are several methods of cladding stainless steel in accordance with the invention. Such cladding may be performed by:

(1) Bonding in the slab stage;
(2) Three-ply pressure bonding in the hot-rolled or cold-rolled strip stage;
(3) Pressure casting; and
(4) Continuous casting of stainless steel slabs for inserts in specially designed ingot molds followed by casting of carbon steel around the stainless steel insert.

For razor blades and cutlery, martensitic or ferritic stainless steels are used. It is preferred, however, that initially the carbon content of the stainless strip should be not greater than 0.6% to prevent the formation of massive carbides during solidification. These carbides are detrimental to the cutting edge of the blade since they may be responsible for "tear outs." "Tear outs" result when the carbides are pulled out of the steel in grinding and honing operations and are detrimental to the cutting edge of the blade particularly if the carbides tear out at or near the cutting edge. The term "grinding" as used herein refers to all operations useful for producing a knife edge, including honing.

In a preferred embodiment for making the composite product of the present invention, a stainless steel within the range of compositions described in Table I is melted and cast into an ingot mold. The ingot is hot rolled to slab form and then conditioned by grit blasting. (Other methods of conditioning such as by machine grinding or conventional mill descaling may also be used.) The slab should be free of scale to form a bond with the carbon steel.

After cleaning and descaling as described above, the steel slab is positioned in a larger ingot mold. The carbon steel is advantageously cast in a vacuum, although an inert atmosphere such as argon may be used. Preferably, a carbon steel jacket is used in the cladding operation but any composition that can be bonded to form a composite structure with any stainless razor blade steel or cutlery grade material can be treated in the same manner. A preferred carbon steel for use herein is described in Table II.

TABLE I

| | C | Mn | P | S | Si | Cr |
|---|---|---|---|---|---|---|
| Range | [1] 0.8 | [1] 1.5 | [1] 0.06 | [1] 0.06 | [1] 1.00 | 5.0–19.0 |
| Preferred range | [1] 0.15 | 0.3–0.7 | 0.01–0.03 | 0.01–0.03 | 0.30–0.90 | 11.0–14.0 |
| Optimum | 0.08 | 0.4 | 0.02 | 0.02 | 0.65 | 13.0 |

[1] Maximum.

with normal levels of residual elements.

TABLE II

| | C | Mn | P | S |
|---|---|---|---|---|
| Range | [1] 1.50 | [1] 1.50 | [1] 0.05 | [1] 0.04 |
| Preferred range | 0.6–0.9 | 0.6–0.9 | 0.02–0.04 | 0.02–0.04 |
| Optimum | 0.8 | 0.7 | 0.03 | 0.03 |

[1] Maximum.

with normal levels of residual elements.

The accompanying drawings and photomicrographs illustrate the novel composite structure in accordance with the invention. In the drawings:

FIG. 1 is a schematic diagram of a composite structure suitable for razor blades and cutlery;

FIGS. 2, 3 and 4 are schematic diagrams of an end view or cross section of composite structure at different stages of manufacture;

FIG. 7 is a schematic diagram of the composite article in accordance with the invention manufactured into a razor blade structure.

Figure 5:
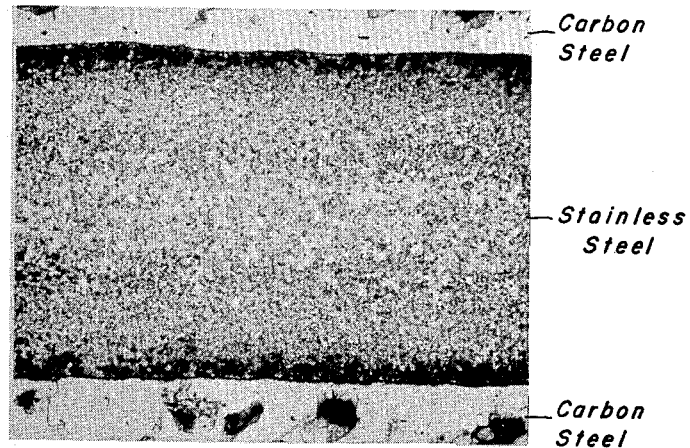
FIG. 5 is a photomicrograph of an 0.09-inch thick carbon clad stainless steel composite assembly spheroidize annealed at 1600° F. This is also simultaneously a diffusion treatment wherein carbon diffuses from the clad to the core eliminating primary carbides.

The typical cross-section of a carbon steel cladding cast around a stainless steel core is shown in FIG. 1. The relative proportion of carbon steel to stainless steel can be adjusted easily. However, it has been found that a ratio of 90%–5% carbon steel to 10%–95% stainless steel is most useful in producing a clad product for cutlery and blades in accordance with the invention. Obviously, the more carbon steel that is used the less costly the clad end product.

For hot rolling, the clad slab is heated to about 2100° F. It is then hot rolled to hot band thickness, e.g. about 0.12-inch, and coiled. A typical range of hot band thicknesses would be from about 0.09 to about 0.15-inch. The diagrams in FIGS. 2, 3 and 4 illustrate the cross sections of strip composites after hot rolling.

In normal processing, the coiled product is annealed in the usual fashion according to the schedule used with stainless steel. For example, a 13% chromium razor blade steel may be spheroidize annealed by heating in an NX atmosphere to 1450° F. at 100° F. per hour, and then to 1650° F. at 50° F. per hour, and held for four hours. Subsequently, the steel is cooled usually at about 50° F. per hour to 1100° F. and then air cooled to room temperature. Table III shows the ranges and the preferred carbon content of the stainless core after carbon diffusion has taken place. The range of carbon (0.7 to 1.3%) is critical for some applications such as razor blades.

TABLE III.—COMPOSITION OF STAINLESS CORE IN COMPOSITE PRODUCT

| | C | Mn | P | S | Si | Cr |
|---|---|---|---|---|---|---|
| Range | 0.7–1.3 | ¹1.5 | ¹0.06 | ¹0.06 | ¹1.00 | 5.0–19.0 |
| Preferred range | 0.9–1.1 | 0.3–0.7 | 0.01–0.03 | 0.01–0.03 | 0.30–0.90 | 11.0–14.0 |
| Optimum | 1.0 | 0.4 | 0.02 | 0.02 | 0.65 | 13.0 |

¹ Maximum.

For the manufacture of 0.004-inch razor blade stock, the steel is pickled and edge trimmed and then cold rolled from about 0.12-inch thick strip to 0.004-inch thick razor blade stock using four process anneals with total reductions of about 60% between each process annealing. The total reduction between each annealing may vary from about 30% to about 80% and thus more or less than four annealings may be used. The spheroidize anneal is conducted on the 0.12-inch material and the four process anneals at 1300° F. for one minute on 0.07, 0.03, 0.01 and 0.0054-inch thick composites. Annealings may be conducted in batch or continuous furnaces.

The carbon clad steel product may be processed much easier than the conventional stainless steel used for cutlery and razor blades. The processing steps for both conventional stainless steel razor blade manufacture and for the carbon clad product are compared in Table IV which illustrates the processing-saving possible with the present invention. As can be seen, for example, the eight anneals used to produce all stainless steel razor blade stock from 0.125-inch gauge hot-rolled strip can be reduced to four with the carbon clad stainless product and the total processing steps are reduced from 23 to 15.

TABLE IV.—PROCESSING OPERATIONS ALL-STAINLESS STEEL VS. CARBON-CLAD STAINLESS STEEL

| | Operations | |
|---|---|---|
| | All-stainless steel 14¾×0.125 inch | Carbon-clad stainless 14½×0.125 inch |
| 1 | Spheroidize anneal | Spheroidize anneal, 1,650° F. |
| 2 | Pickle | Pickle. |
| 3 | Slit to 14¼ inch | Slit to 14 inch. |
| 4 | Anneal | Roll to 0.070 inch. |
| 5 | Roll to 0.080 inch | Slit to 13¾ inch. |
| 6 | Anneal | Anneal 1,300° F. |
| 7 | Slit to 14 inch | Roll to 0.030 inch. |
| 8 | Anneal | Anneal 1,300° F. |
| 9 | Roll to 0.050 inch | Roll to 0.0125 inch. |
| 10 | Anneal | Slit to 13½ inch. |
| 11 | Surface grind | Anneal 1,300° F. |
| 12 | Slit to 13¾ inch | Roll to 0.0054 inch. |
| 13 | Anneal | Slit to 6⅝ inch. |
| 14 | Roll to 0.025 inch | Anneal. |
| 15 | Slit to 13½ inch | Roll to 0.0039 inch. |
| 16 | Anneal | |
| 17 | Roll to 0.0125 inch | |
| 18 | Anneal | |
| 19 | Roll to 0.0054 inch | |
| 20 | Slit to 6⅝ inch | |
| 21 | Anneal | |
| 22 | Polish | |
| 23 | Roll to 0.0039 inch | |

The processing may vary depending upon final gauge desired ranging from 0.001-inch to 0.015-inch thick for razor blades and heavier gauges for cutlery.

Figure 6:
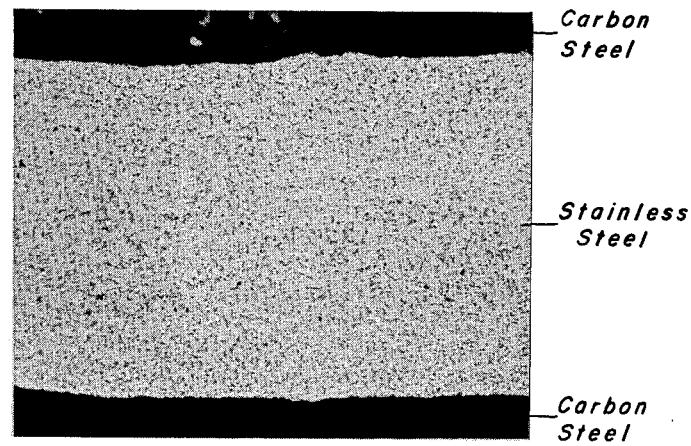
FIG. 6 is a photomicrograph of an 0.010-inch thick carbon clad stainless steel composite assembly austenitized at 1950° F., quenched in water, requenched at −100° F., and tempered at 400° F. A finished razor blade thickness may vary as shown in Table IV.

Photomicrographs of samples taken after the initial carbon diffusion spheroidize annealing treatment and the hardening treatment at 0.010-inch are shown in FIGS. 5 and 6, respectively. These microstructures illustrate the initial and final cross sections as the composite is cold rolled to finish size.

The diagram in FIG. 7 shows the final product of the composite clad assembly in the production of razor blades. As can be seen, after grinding the stainless steel core is exposed as the cutting edge and the carbon steel cladding makes up a major portion of the thickness, thus constituting a significant saving in the cost of stainless steel used in the blade.

The annealing treatment of the composite assembly described herein is preferably performed at temperatures in the range of 1400 to 1650° F. At these temperatures, the stainless steel is spheroidized and the carbon steel is austenitized and carbon diffusion from the carbon steel to the stainless core occurs. Following furnace cooling from 1650 to 1100° F., and air cooling to room temperature, the austentite of the carbon steel transforms to pearlite. In a later stress-relief annealing at 1300° F. after cold working, the carbon steel may also be spheroidized. Thus, the heat treatments given for the material are compatible for both the carbon and stainless steels. Because of the relatively soft carbon steel jacket which desirably advantageously comprises 50 to 85% of the assembly, the composite may be cold rolled to a minimum of 50% reduction in area without a process annealing.

We claim:

1. A carbon-steel clad stainless steel composite suitable for cutlery comprising a core of non-austenitic stainless steel consisting essentially of 0.9 to 1.1% carbon, 11.0 to 14.0% chromium, 0.3 to 0.7% manganese, 0.3 to 0.9% silicon, and up to 0.06% each of phosphorus and sulfur; and a carbon-steel cladding metallurgically bonded on each side thereof; the proportion of carbon steel in said composite being in the range of 10 to 95%; and at least one edge of said composite being V-shaped with the stainless steel core at the vertex.

References Cited

UNITED STATES PATENTS

| 2,034,278 | 3/1936 | Becket | 29—196.1 |
| 3,254,971 | 6/1966 | Forsberg | 29—191.6 |
| 1,644,097 | 10/1927 | Von Gesack | 75—126 |
| 2,087,051 | 7/1937 | Stargardter | 30—346.53 |
| 2,105,583 | 1/1938 | Casselman | 30—350 |
| 3,349,488 | 10/1967 | Craig | 30—346.53 |

HYLAND BIZOT, Primary Examiner